United States Patent [19]
Dunn et al.

[11] Patent Number: 5,372,392
[45] Date of Patent: Dec. 13, 1994

[54] CONNECTING DEVICES

[75] Inventors: Myron Dunn, Littleton; Kevin T. Dickson, Denver; Urs T. Moeker, Littleton, all of Colo.

[73] Assignee: Norgren Co., Littleton, Colo.

[21] Appl. No.: 80,723

[22] Filed: Jun. 24, 1993

[51] Int. Cl.$^5$ .............................. F16L 25/04
[52] U.S. Cl. .................. 285/334.1; 285/24; 285/364
[58] Field of Search ........... 285/31, 334.1, 325, 285/326, 364, 365, 406, 407, 420, 424, 366, 367

[56] References Cited

U.S. PATENT DOCUMENTS

| | | | |
|---|---|---|---|
| 1,484,491 | 2/1924 | Gutermann | 285/424 X |
| 3,338,599 | 8/1967 | Hallman | 285/424 X |
| 3,432,185 | 3/1969 | Rosengren | 285/424 X |
| 3,677,517 | 7/1972 | Root et al. | 285/424 X |
| 4,146,261 | 3/1979 | Edmaier et al. | 285/364 |
| 4,289,335 | 9/1981 | Olbermann | 285/364 X |
| 4,400,018 | 8/1983 | Abbes et al. | 285/31 |
| 4,915,418 | 4/1990 | Palatchy | 285/367 X |

*Primary Examiner*—Dave W. Arola
*Attorney, Agent, or Firm*—Cushman, Darby & Cushman

[57] ABSTRACT

A connecting device for sealingly connecting together a pair of modular compressed air conditioning units, for example a filter and a lubricator, comprises a generally rectangular clamp adapted to engage a pair of ported flanges formed respectively on the units to be connected so as to urge the units into fluid-tight communication with one another via an intermediate ported spacer retaining O-ring seals. One side of the rectangular clamp is pivotally mounted so that it can be pivoted out of its operative position to permit reception of the flanges into the clamp and then pivoted back into its operative position in which it can be releasably locked by tightening a bolt. The device may be unitary in nature, i.e. has no separate parts that might otherwise get lost, and is simple to manufacture and manipulate.

9 Claims, 4 Drawing Sheets

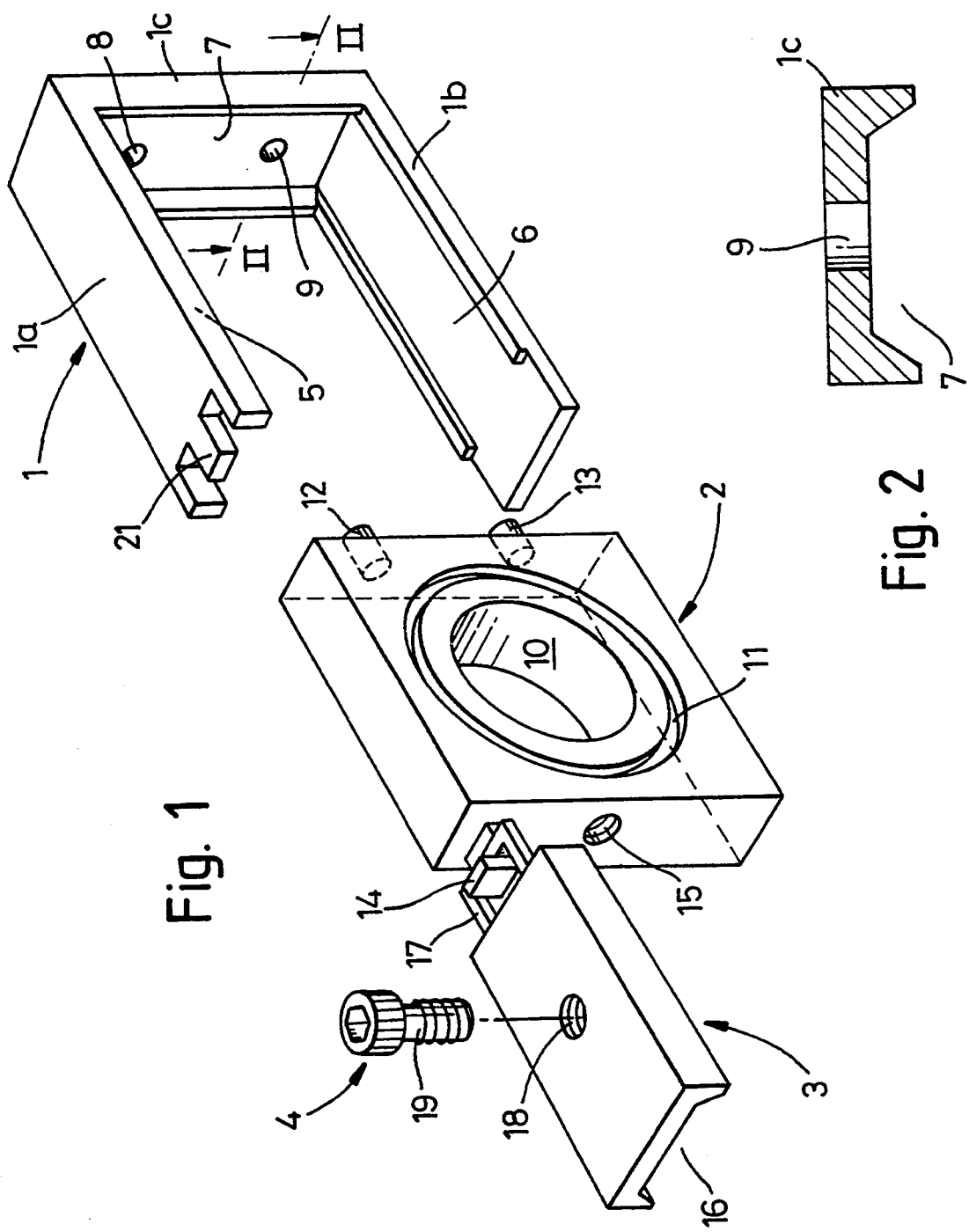

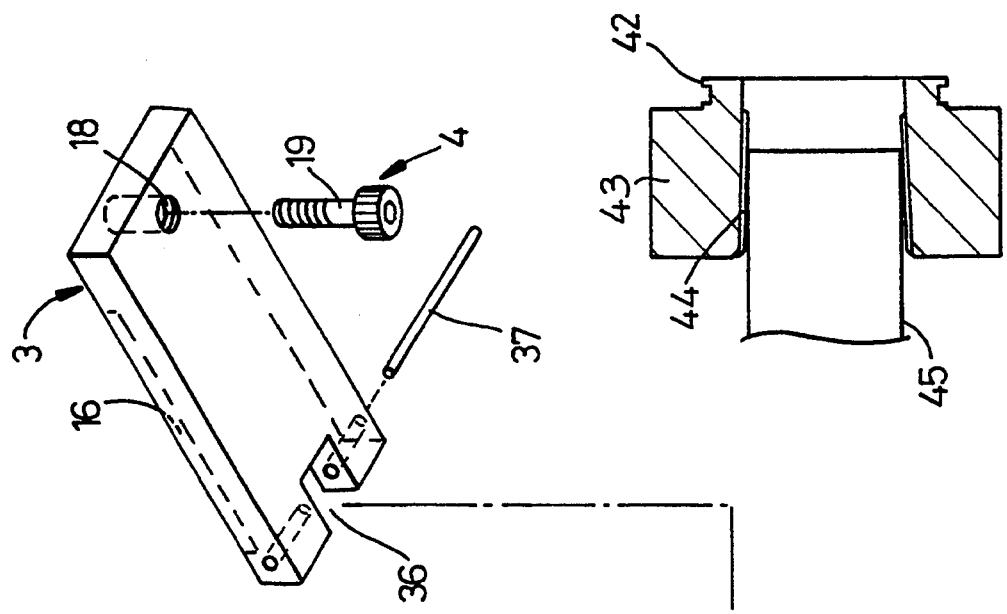
Fig. 6
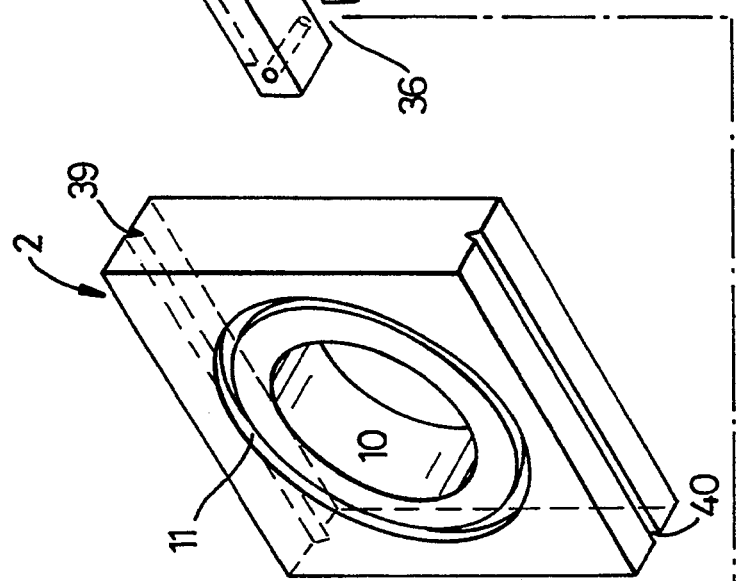
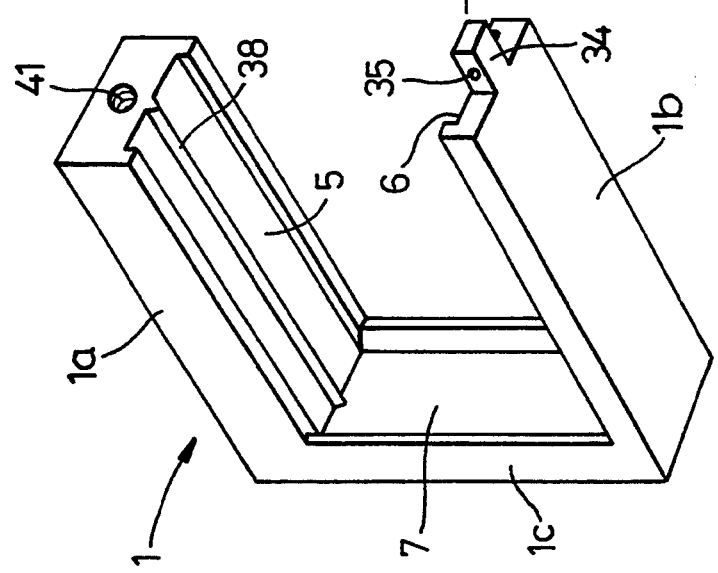
Fig. 5

CONNECTING DEVICES

BACKGROUND OF THE INVENTION

1. Field

This invention relates to devices for connecting together fluid flow elements, especially but not exclusively fluid-conditioning units, such as, for example, pressure regulators, filters and lubricators for use in compressed air systems.

2. Prior Art

As is well-known, a compressed air pipeline usually includes, intermediate the air compressor and a point of use, a plurality of conditioning units through which the compressed air sequentially passes. Depending on the circumstances, there will usually be two or more such units positioned adjacent to one another. For example, a typical arrangement might comprise a bank of three units, namely a filter, regulator and lubricator. In any event, it is known to provide "modular" units, and means for connecting them, whereby any number of units, as desired, may be readily connected together and into the compressed air pipeline so that the air will pass though them in the desired sequence, for example through a filter, pressure regulator and lubricator, in that order. Several connecting means have over the years been developed and commercialized but, whilst technically satisfactory, many have been relatively expensive to produce and/or have consisted of loose parts that have to be assembled by the user, some of which are susceptible to being lost.

It is an object of the present invention to provide a simple, relatively inexpensive, preferably unitary connecting means for sealingly connecting together fluid flow elements which permits ready disconnection of the elements when desired.

SUMMARY OF THE INVENTION

In its broadest aspect, the present invention provides connecting means for contiguously connecting together a pair of fluid-flow elements, said means comprising a four-sided, generally rectangular clamp adapted, in its operative clamping position, to engage, in parallel relationship with one another, a pair of ported flanges associated respectively with said elements and further comprising sealing means for establishing fluid-tight communication between the respective ports formed in said flanges, one of said sides of the clamp being pivotally mounted so that said one side can be pivoted out of said operative clamping position in order to permit reception of said flanges into the clamp and then pivoted back into said operative clamping position, and locking means to lock said one side in said operative clamping position.

In a preferred embodiment, the sealing means comprises a rectangular, plate-like spacer having a fluid flow bore extending through it between its two major faces, the bore being about the same diameter as the ports in said flanges, and the spacer is located centrally within the generally rectangular clamp by, for example, one or more screws or rivets. Each major face of the spacer has a sealing surface circumscribing the opposite extremities of the bore and each sealing surface may support, for example in an annular groove, an O-ring seal. In such preferred embodiment, the locking means preferably comprises a screw or bolt held captive by the pivotally mounted side of the clamp and which can be screwed to tightness into a threaded bore formed in the spacer or in an adjacent side of the clamp. Preferably, the said one side of the clamp is pivotally mounted on the spacer or on an adjacent side of the clamp by means of a hinge-like mounting.

Accordingly, it will be appreciated that the connecting means of the invention may be a unitary structure in the sense that it has no loose parts that might otherwise get lost by the user.

BRIEF DESCRIPTION OF THE DRAWINGS

Preferred embodiments of the invention will now be described in more detail, by way of example only, with reference to the accompanying drawings in which:

FIG. 1 is a perspective view, in exploded form, of a connecting means constructed in accordance with the invention;

FIG. 2 is a cross-section on the line II—II of FIG. 1;

FIG. 5 is a similar view to that of FIG. 1 showing an alternative design of connecting means constructed in accordance with the invention; and FIG. 6 is a sectional side elevation of a screw-threaded flange adapted to connect a pipeline to a compressed air conditioning unit using a connecting means of the invention.

DESCRIPTION OF THE PREFERRED EMBODIMENTS

Figure 3:
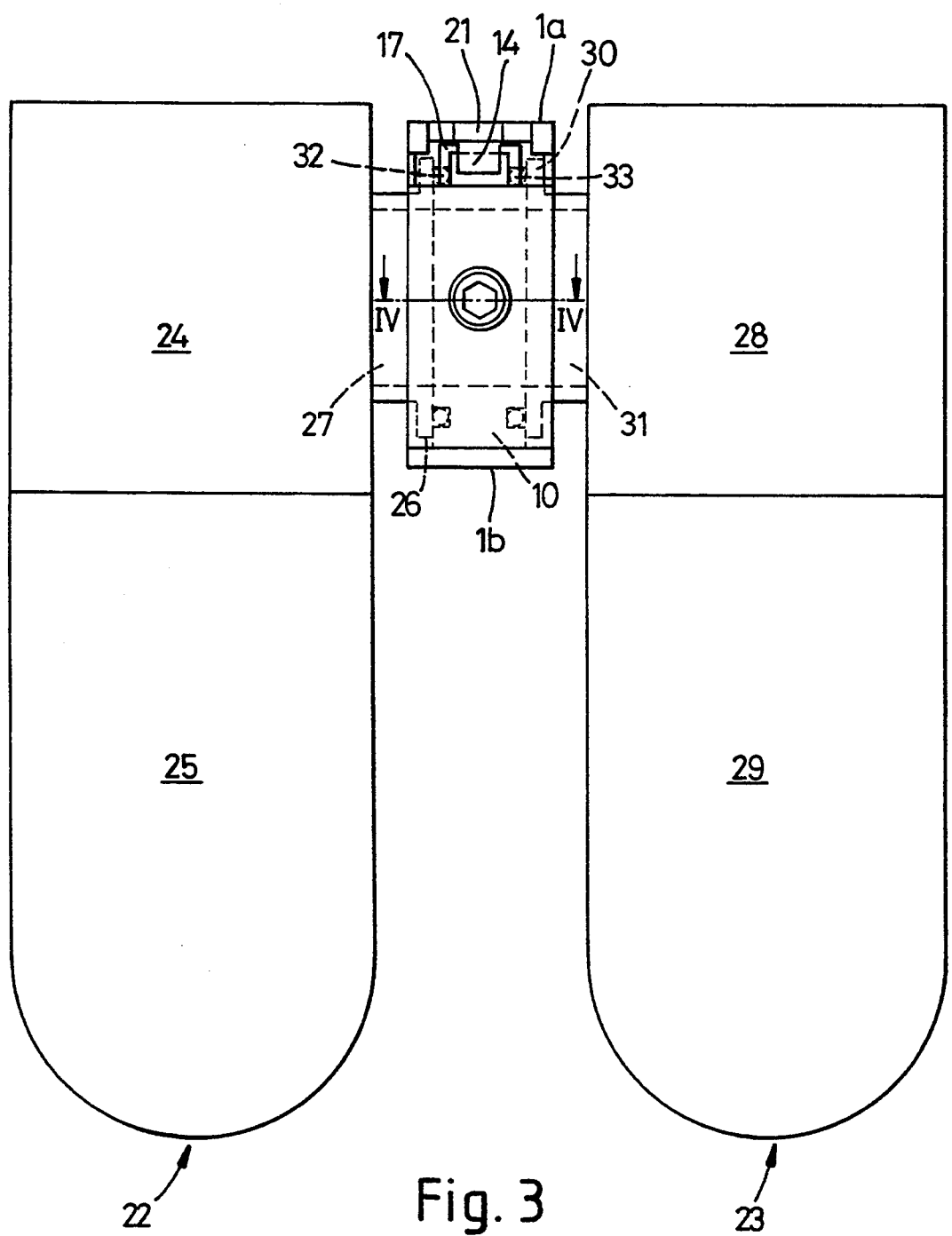
FIG. 3 is a front elevation of the connecting means of FIGS. 1 and 2 showing it connecting together a compressed air filter unit and a compressed air lubricator unit.

Referring firstly to FIGS. 1 and 2, the connecting means basically comprises four separately formed components, namely a three-sided, generally U-shaped member 1, a rectangular spacer 2, an elongate member 3 and a bolt 4. As can be seen, the member 1 consists of three sections, namely a top section 1a, a bottom section 1b and a rear section 1c. The sections 1a, 1b and 1c define, internally, respective channels 5, 6, 7 the walls of which, in use, receive between them and the spacer 2 the periphery of a ported, rectangular flange formed on each of the conditioning units to be joined together (see FIGS. 3 and 4). The walls of the respective channels 5, 6 defined by the top and bottom section 1a, 1b are parallel whereas those defined by the channel 7 of the rear section 1c are tapered (see FIG. 2). The rear section 1c is formed with a pair of apertures 8, 9.

The rectangular spacer 2 has a bore 10 formed in it corresponding more or less to the diameter of the ports formed in the flanges of the units to be joined. Each major face of the spacer 2 is formed with an annular groove, one of which is shown at 11, for receiving an O-ring seal. The rear face of the spacer 2 is provided with a pair of cylindrical spigots 12, 13 dimensioned to pass through the apertures 8 and 9 respectively formed in the rear section 1c of the member 1 when the member 1 and the spacer 2 are assembled together, as is described later. The front edge face of the spacer 2 is formed with an L-shaped projection 14 and also with a tapped bore 15.

The elongate member 3 defines internally a channel 16 having tapering walls like those of the channel 7 defined by the section 1c of U-shaped member 1. The upper end of the elongate member 3 is provided with a generally U-shaped stirrup 17 pivotally hung on the L-shaped projection 14. The elongate member 3 is further formed with a tapped bore 18.

The bolt 4 is formed with a thread-relieved portion 19 whereby it may be received fully, and held captive, in the bore 18 of member 3 whilst still being able to rotate.

The components 1 to 4 will typically be made of a metal, although engineering plastics materials could be used for some or all of the parts.

In the assembled form of the connecting means, the spacer 2 is located symmetrically within the member 1 with the spigots 12 and 13 extending through, and projecting beyond, the apertures 8 and 9 respectively formed in the rear section 1c of the member 1, the projecting portions of the spigots 12 and 13 being upset to form a rivet-like connection between the member 1 and the spacer 2. This is clearly seen in FIG. 4, the rivet head on the spigot 13 being denoted by reference numeral 20. Alternatively, the spigots 12 and 13 could be dispensed with and the spacer 2 connected to the member 1 by screws or the like.

Figure 4:
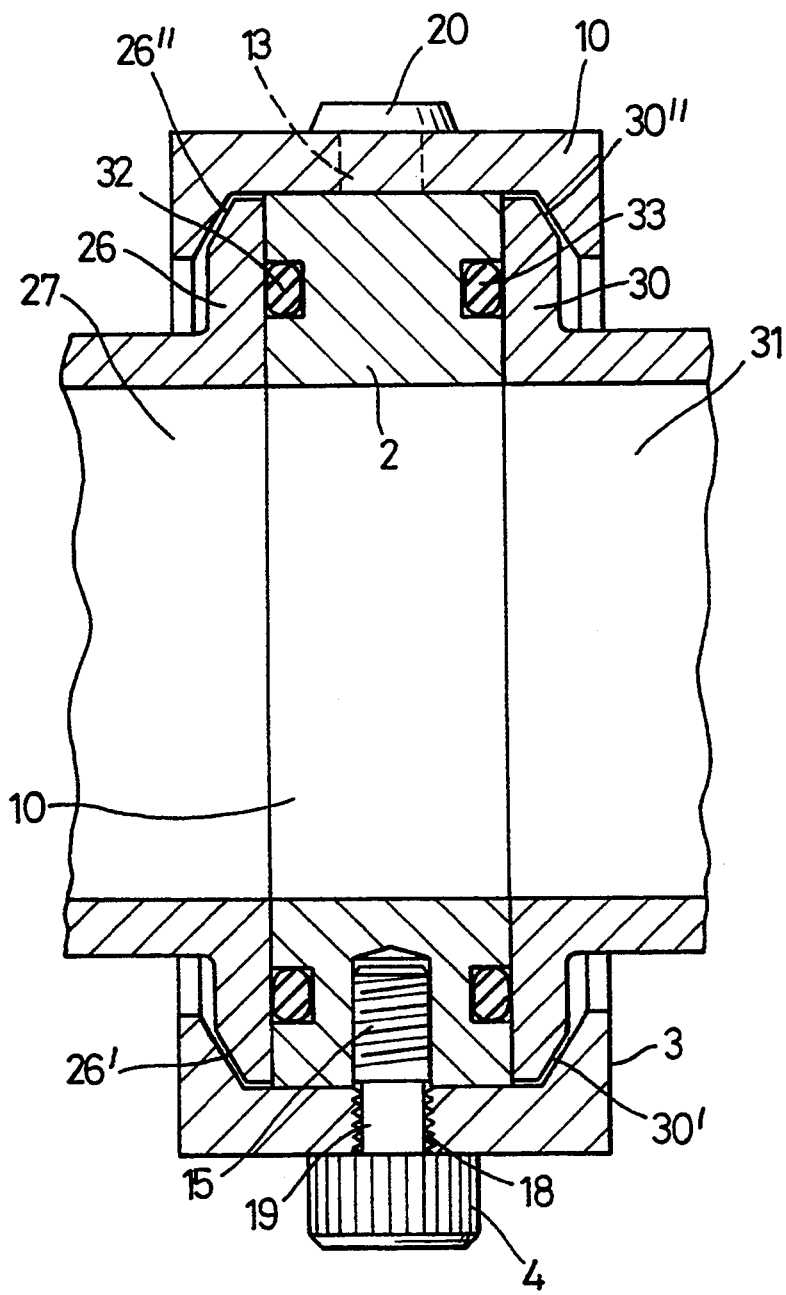
FIG. 4 is an enlarged cross-section on the line IV—IV of FIG. 3.

FIG. 3 shows a compressed air filter unit 22 and lubricator unit 23 (both units being depicted diagrammatically) connected together by the connecting means shown in FIG. 1 and FIG. 2. More particularly, the unit 22, as is well-known, comprises a body portion 24 from which depends a usually transparent bowl 25. The body 24 is provided with a rectangular connecting flange 26 having an outlet port 27 that communicates with the internals of the filter unit 22. The two opposed vertical edges of the flange 26 are bevelled as shown at 26' and 26" (see FIG. 4). The unit 22 is further provided with a like connecting flange and inlet port (not shown) on the opposite side of the body portion 24. The lubricator unit 23 similarly comprises a body portion 28, a depending bowl 29 and a rectangular connecting flange 30 (whose opposed vertical edges are bevelled as shown at 30' and 30") having an inlet port 31 that communicates with the internals of the lubricator unit 23. As in the case of the filter unit 22, the lubricator unit 23 is also formed with a like connecting flange and outlet port (not shown) on the opposite side of the body portion 28.

The filter unit 22 and lubricator unit 23 are connected together by locating the flanges 26 and 30 into the connecting means with the member 3 in its raised position (the position shown in FIG. 1). The member 3 is then lowered and the bolt 4 engaged with the tapped bore 15. The bolt 4 is then tightened whereupon the tapered walls of the sections 1c and 3 co-operate with bevelled portions 26', 26" and 30', 30" of the flanges 26 and 30 thereby urging the latter into sealing engagement with the spacer 2 and bringing the ports 27 and 31 into sealed communication with one another via the bore 10 formed in the spacer 2. Fluid tightness is ensured by O-rings 32 and 33 (the latter being located in the groove 11 shown in FIG. 1). Disconnection of the units may readily by achieved by reversing the above operation.

As will be appreciated, the preferred connecting means of the invention described above is, when its components are assembled together, unitary in nature, is relatively simple and inexpensive to manufacture and is simple to manipulate.

As will further be appreciated, the connecting means described above may be used "upside down" relative to the orientation specifically described above, i.e. wherein the member 3 is, in use, hingedly mounted on the spacer 2 near the bottom of the latter's front face, in which case the member 3 would be raised, rather than lowered, into its operative position, followed by tightening of the bolt 4. The connecting means shown in FIG. 5 is shown in this orientation.

Referring in more detail to FIG. 5, the clamping means is in essence very similar to that shown in FIG. 1 to 4 and similar parts shown in FIG. 5 bear the same numerals used in those Figures. However, rather than the elongate member 3 being pivotally mounted on the spacer 2, it is mounted on the lower section 1b of the U-shaped member 1. More particularly, the upper section 1a is formed with a protrusion 34 having a lateral bore 35 externally through it. In the assembled connecting device, the protrusion 34 is located in a U-shaped cut-out 36 at the top of the member 3 and the two are retained together in hinge-like fashion by means of a pin 37 that passes through the bore 35.

Further, the spacer 2, which need not in this embodiment be rigidly secured to the clamp 1, is simply located in place within the clamp 1 by means of elongate triangular projections, one of which is shown at 38, which engage in correspondingly shaped recesses 39, 40 formed in the spacer 2.

Furthermore, the bolt 4, in the operative clamping position of the connecting means, engages in a threaded bore 41 formed in the front face of the upper section 1a of the clamp 1, rather than in a bore formed in the spacer 2.

Referring to FIG. 6, this shows a flange 42, like the flanges 26 and 30, formed integrally with a member 43 formed internally with threads 44 whereby a threaded compressed air pipeline 45 may be connected to a compressed air-conditioning unit such as 22 or 23 of FIG. 3 using a connecting device as shown in FIGS. 1 to 4 or in FIG. 5.

As will be appreciated, the connecting means of the invention may be used to connect together fluid-flow elements other than compressed air-conditioning units and compressed air pipelines such as, for example, hydraulic units or pipelines, water pipelines etc. Further, it will be appreciated that a variety of design modifications may be made to the connecting means specifically described above without departing from the scope of the appended claims.

What we claimed is:

1. Connecting structure for contiguously connecting together a pair of fluid-flow elements, each fluid flow element including flange so as to define a pair of ported flanges associated with the fluid-flow elements, said connecting structure comprising:

a four-sided, generally rectangular clamp adapted, in its operative clamping position, to engage, in parallel relationship with one another, the pair of ported flanges, one of said sides of the clamp being pivotally mounted so that said one side can be pivoted out of said operative clamping position in order to permit reception of said flanges into the clamp and then pivoted back into said operative clamping position, sealing means for establishing fluid-tight communication between the respective ports formed in said flanges, and locking means for releasably locking said one side in said operative clamping position, in which position the clamp urges the flanges towards one another thereby establishing together with said sealing means, said fluid-tight communication between said ports.

2. Connecting means according to claim 1 wherein said sealing structure comprises a generally rectangular, plate-like spacer located centrally within said clamp and having two opposed, major parallel faces for sealingly abutting respectively said ported flanges, said spacer having a fluid flow bore extending through it between said faces so as to provide a fluid path between the ports of said flanges and thus between the two elements.

3. Connecting structure according to claim 2 wherein each of said faces of the spacer is provided with a groove circumscribing said fluid flow bore, said grooves retaining respective resilient sealing means.

4. Connecting structure according to claim 2 wherein said one side of clamp, and the opposite side thereof, comprise internally tapered walls for engaging opposed peripheral sections of each of said ported flanges whereby said flanges will be urged into sealing engagement with said opposed major faces of the spacer upon application of said locking means.

5. Connecting including means for retaining said spacer within said clamp and structure according to claim 2 wherein said one side of the clamp and said spacer have coacting means for captively and pivotally mounting said one side on said spacer.

6. Connecting structure according to claim 5 wherein said locking means comprises a threaded fastener mounted on said one side of the clamp and engageable to tightness with a threaded port formed in the spacer to lock said one side in said operative clamping position.

7. Connecting structure according to claim 1 wherein said one side of the clamp is captively and pivotally mounted on an adjacent side of said clamp.

8. Connecting structure according to claim 7 wherein said locking means comprises a threaded fastener mounted on said one side of the clamp and engageable to tightness with a threaded port formed in the other adjacent side of the clamp.

9. Connecting structure according to claim 1, wherein said fluid flow elements include a first compressed air-conditioning unit and a second air-conditioning unit, said clamp being constructed and arranged to connect said first compressed air-conditioning unit to said second air-conditioning unit.

* * * * *

UNITED STATES PATENT AND TRADEMARK OFFICE
CERTIFICATE OF CORRECTION

PATENT NO. : 5,372,392

DATED : December 13, 1994

INVENTOR(S) : DUNN et al.

It is certified that error appears in the above-indentified patent and that said Letters Patent is hereby corrected as shown below:

Column 4, line 46, following "including" insert —a generally rectangular ported—;

Column 4, line 67, change "means" to —structure—;

Column 4, line 68, change "structure" to —means—;

Column 5, line 20, following "connecting" insert —structure according to claim 2—;

Column 5, lines 21-22, delete "structure according to claim 2".

Signed and Sealed this

Eleventh Day of April, 1995

*Attest:*

BRUCE LEHMAN

*Attesting Officer*     *Commissioner of Patents and Trademarks*